(12) United States Patent
Lasky (10) Patent No.: US 6,367,078 B1
(45) Date of Patent: Apr. 2, 2002

(54) ELECTRONIC PROGRAM-GUIDE SYSTEM WITH SIDEWAYS-SURFING CAPABILITY

(76) Inventor: Michael Lasky, 6740 N. 25th St., Arlington, VA (US) 22213

( * ) Notice: Subject to any disclaimer, the term of this patent is extended or adjusted under 35 U.S.C. 154(b) by 0 days.

(21) Appl. No.: 08/990,210

(22) Filed: Dec. 12, 1997

(51) Int. Cl.[7] .............................................. H04N 5/445
(52) U.S. Cl. ........................... 725/52; 348/734; 725/38; 725/45
(58) Field of Search ........................... 348/10, 13, 327, 348/731, 734; 725/37, 38, 39, 44, 45, 52

(56) References Cited

U.S. PATENT DOCUMENTS

| | | | | | |
|---|---|---|---|---|---|
| 5,296,931 A | * | 3/1994 | Na | .............................. | 348/731 |
| 5,585,865 A | * | 12/1996 | Amano et al. | ............... | 348/731 |
| 5,589,892 A | * | 12/1996 | Knee et al. | .................. | 348/731 |
| 5,621,456 A | * | 4/1997 | Florin et al. | ..................... | 348/7 |
| 5,629,733 A | * | 5/1997 | Youman et al. | ................. | 348/7 |
| 5,812,123 A | * | 9/1998 | Rowe et al. | ................. | 345/327 |
| 5,822,123 A | * | 10/1998 | Davis et al. | ................. | 348/564 |
| 5,880,768 A | * | 3/1999 | Lemmons et al. | ............. | 348/1 |
| 5,963,269 A | * | 10/1999 | Beery | .......................... | 348/570 |
| 5,986,650 A | * | 11/1999 | Ellis et al. | ................... | 345/327 |

* cited by examiner

Primary Examiner—John W. Miller (57) ABSTRACT

An electronic program-guide (EPG) system enables a viewer of a television program in a particular category to surf sideways to another program in the same category. The EPG system indicates the availability of such other channels carrying programs in the same category in a channel hat superimposed on the video at the top of the picture. The channel hat may also contain the channel number, title and category of the program in the channel just selected, and it is displayed for a few seconds. Normal surfing up and down to higher or lower-numbered channels is also supported in the usual way in response to the up and down arrow-keys on a remote control device. When the viewer presses the right or left-arrow key, the EPG system surfs sideways to the next higher or lower channel carrying a program in the same category as the current program. Right and left-arrow keys exist on the remote controls of some prior-art electronic program guides without having any function assigned when television programs when the viewer is surfing.

18 Claims, 11 Drawing Sheets

FIG. 2
(PRIOR ART)

FIG. 6A
PROGRAM-GUIDE DATABASE

| 611 | CHANNEL NUMBER |
| 612 | TITLE |
| 613 | FIRST TIME SLOT |
| 614 | START OFFSET |
| 615 | LENGTH |
| 616 | END OFFSET |
| 617 | CATEGORY |

61

FIG. 6C
VARIABLES MAINTAINED BY
ELECTRONIC PROGRAM GUIDE TO
SUPPORT SIDEWAYS SURFING

| 63 | SLE | SURF LEFT ENABLE |
| 64 | SLN | SURF LEFT CHANNEL NO. |
| 65 | SRE | SURF RIGHT ENABLE |
| 66 | SRN | SURF RIGHT CHANNEL NO. |
| 67 | NCN | NEXT CATEGORY CHANNEL NO. |
| 68 | PCN | PREVIOUS CATEGORY CHANNEL NO. |

FIG. 7

FIG. 9A
FLOW CHART OF ALGORITHM UPDATE THE CHANNEL HAT AND CATEGORY

FIG. 9B
STEPS ADDED TO ALGORITHM 90 TO PREPARE FOR SURFING TO A CHANNEL CARRYING A PROGRAM IN THE PREVIOUS CATEGORY

ELECTRONIC PROGRAM-GUIDE SYSTEM WITH SIDEWAYS-SURFING CAPABILITY

FIELD OF THE INVENTION

The present invention is directed to an electronic program-guide (EPG) system that enables a television viewer of a program in a particular category to "sideways surf" to the next channel carrying another program in the same category.

BACKGROUND OF THE INVENTION

The capacity of television-distribution systems is beginning to exceed the decision-making capability of the average viewer. Currently, over 60 million households in the United States subscribe to one of over 10,000 cable-television systems, and more than 45% of those subscribers receive 54 or more channels. In addition, over 5 million US households subscribe to satellite-television services that use digital-compression technology allowing up to 200 channels. In the future, high-bandwidth cable systems using digital compression will be able to offer more than 500 channels of standard quality, although this number will be reduced if some of the channels carry high-definition programming.

A. Television-Distribution Systems

Figure 1:
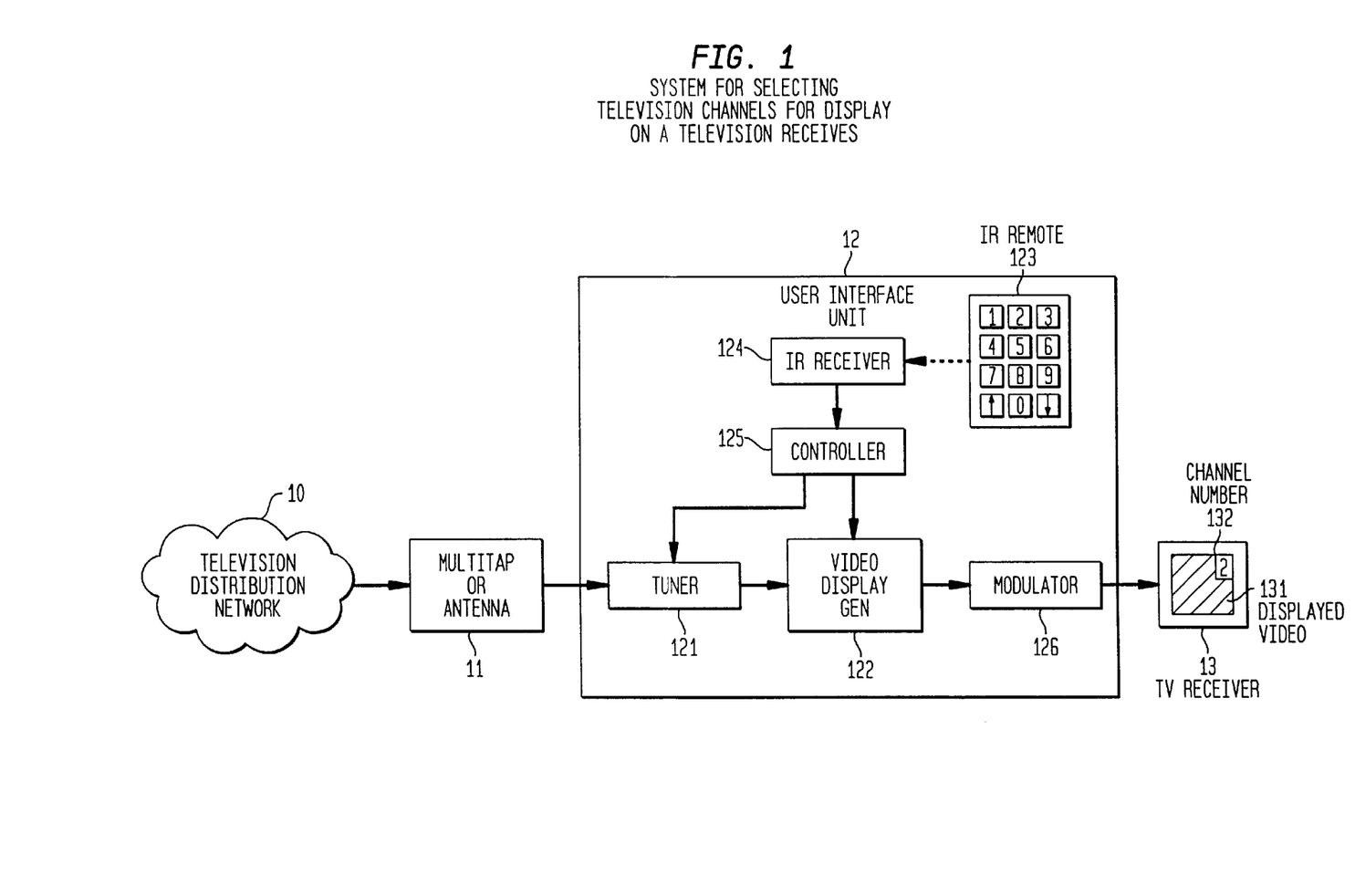
FIG. 1 schematically illustrates a user-interface unit for selecting a television channel on a television-distribution network for display on a television receiver.

FIG. 1 depicts a typical prior-art system in which a television-distribution network 10 delivers television signals in channels to a simple user-interface unit 12 that functions as a channel selector. The television-distribution network may be a cable-television system as described by Walter S. Ciciorca in "Cable Television in the United States—An Overview," which was published by Cable Television Labs in 1995. In a cable-television system, a network interface 11 such as a multitap allows for splitting the signals off a distribution cable of the network for transmission along a drop cable into the subscriber's premises. The television-distribution network could also be a direct-broadcast satellite (DBS) system. A DBS system delivers television signals in channels on a microwave carrier to a subscriber's user-interface unit. A third type of distribution system called "wireless cable" or MMDS (for Multichannel Multipoint Distribution Services) also uses a microwave carrier, but the transmitters are on the ground. Multiple transmitters are used to extend the range of a system from the 30–40 mile line-of-sight range of a single transmitter. Both DBS and MMDS distribution systems use a stationary dish antenna as the network interface 11 to acquire the microwave carrier at the subscriber's premises. The television distribution network may also be traditional broadcast television, wherein the network interface may be a roof-mounted antenna or rabbit-ears.

B. Channel Selector

In the typical prior-art system of FIG. 1, a viewer controls a user-interface unit 12 at a remote control 123, which is typically an infrared transmitter. The viewer can enter a channel number on a numeric keypad of the remote control, and a receiver 124 will forward the number to a controller 125. In a simple system, the controller accepts two numbers at a time, so if the viewer wants channel 2, he or she presses the 0 key before pressing the 2 key. The controller causes a tuner 121 to pass a video signal 131 of the selected channel to a video-display generator 122. The video-display generator also receives the selected channel number directly from the controller and overlays a graphical representation of the channel number 132 on the video of the selected channel. Typically the controller presents a newly selected channel number to the video-display generator only for a few seconds, to allow the viewer to confirm the selection that he or she made. The selected video is remodulated at a modulator 126 so that it may be received by the TV receiver 13 at a fixed channel, usually channel 3 or 4. The viewer may also press up and down-arrow keys on the remote control to cause the user-interface to select the next higher or lower channel number. When the network is a cable-television network, the user-interface unit 12 may be incorporated in a cable-ready VCR or television receiver. Satellite-ready television receivers have been produced also, but it is more common to use a separate user-interface unit with a DBS or MMDS distribution network, because a relatively expensive tuner is used to receive channels from the microwave carrier of those systems.

C. Non-Interactive Program Guides

A viewer who is interested in a particular type of program can consult television listings provided in magazines and newspapers. However, these sources list program titles by channel and time slot, so the viewer must read the titles of all the programs offered at the time of interest. TV Listings published in newspapers and magazines fail to reflect schedule changes caused by special broadcasts or by the unpredictable timing of live events. Printed listings are also incomplete as to which channel number a viewer should select, especially for cable channels.

Figure 2:
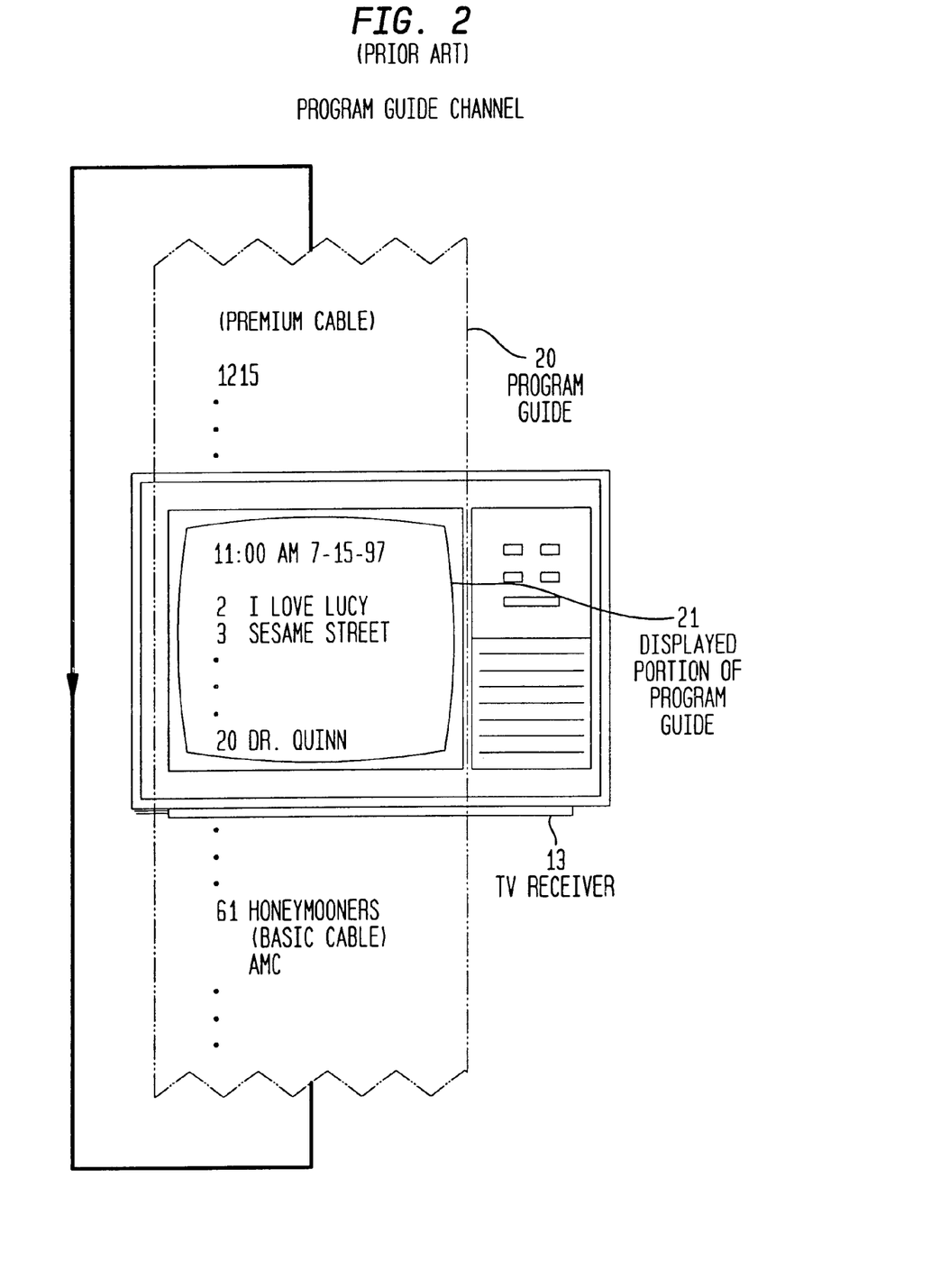
FIG. 2 illustrates a non-interactive television program guide displayed on a television receiver.

If the viewer subscribes to a television-distribution service, he or she can also usually select a special channel that is dedicated to a program guide 20 as depicted in FIG. 2. Program-guide channels are also inconvenient because standard-quality television can display only a limited amount of readable text. Therefore only a few channel listings are shown at a time and slowly scroll the program-guide information through the displayed video 21. In the example shown in FIG. 2, a viewer who wants to watch a sitcom will have to remember that there is such a program on channel 2 until the listing for channel 61 appears on the screen. Thereafter, the viewer will have to remember which programs are showing on both channels 2 and 61 while many other listings scroll onto the screen. This takes some effort and intensifies the impatience viewers feel while waiting for the program-guide channel to return to where it was when they started watching it. Very often, viewers ignore the program-guide channel instead, preferring to "surf" up or down through the channels instead, watching a few seconds of each program to see if it looks interesting.

D. Interactive Electronic Program-Guide System

Figure 3:
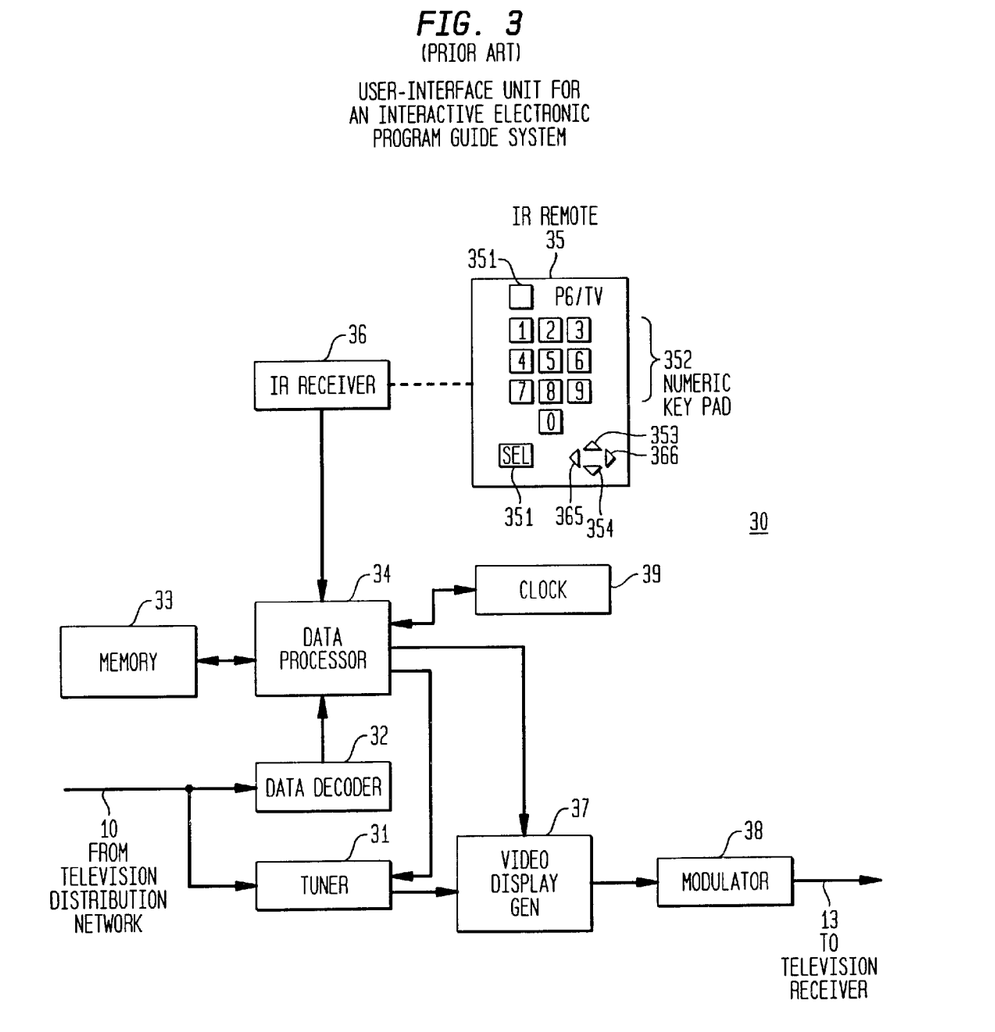
FIG. 3 schematically illustrates a user-interface unit for displaying an interactive electronic program-guide system.

Interactive electronic program-guide systems are also known in the art. An electronic program-guide system comprises data and software that reside in a user-interface unit that is commonly referred to as a set-top box. For example, a system for controlling a television receiver to allow user selection of broadcast programs from schedule information is disclosed in U.S. Pat. No. 4,706,121 issued to Patrick Young on Nov. 10, 1987. FIG. 3 depicts an illustrative user-interface unit 30 that receives television signals in channels from the television-distribution network 10 at a tuner 31. The user-interface unit also receives a program guide at a data decoder 32. The program guide may be thought as a spread sheet with rows labeled by channel numbers, columns labeled by time slots, and titles of scheduled programs filled into cells that may occupy one or more half-hour time slots. A data processor 34 moves the program guide into a memory 33 for later use.

User-interface unit 30 allows a viewer to choose a program-guide (PG) mode and a television (TV) mode. The viewer can toggle back and forth between these modes by pressing a PG/TV key 351 at a remote control 35. In TV mode, a numeric-key array 352 and up and down-arrow keys 353 and 354, respectively, allow the viewer to select programs in the same way as described above in connection with the channel selector shown in FIG. 1. The data processor also causes the video-display generator 37 to superimpose the channel number 132 on the video 131 of the channel just selected for a few seconds.

Figure 4:
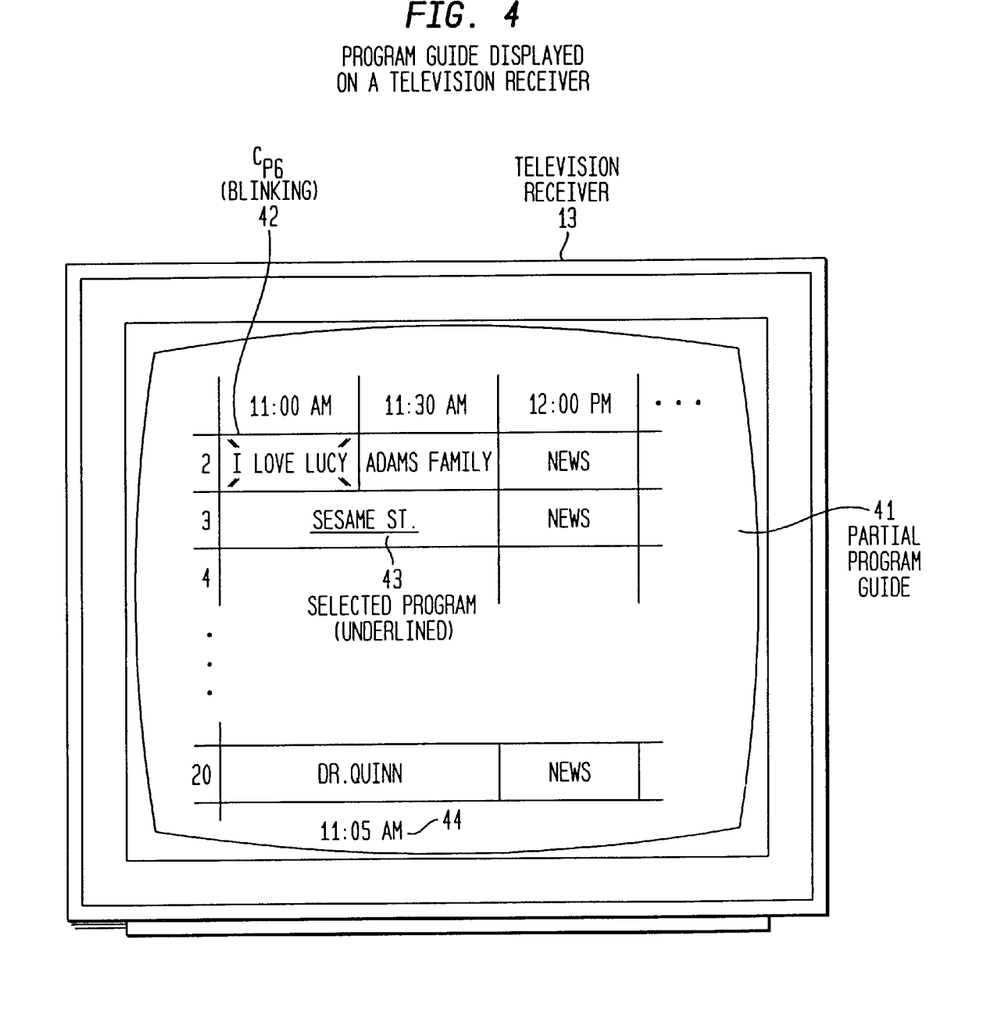
FIG. 4 illustrates an interactive electronic program-guide system displayed on a television receiver.

When the electronic program guide is in TV mode and the viewer presses the PG/TV button, a signal is received at a receiver 36, where it is accessible to the data processor 34. The data processor responds by retrieving a portion of the program guide from the memory and sending it to a video-display generator 37. The video-display generator shows a portion of the program-guide spreadsheet 41 on the television receiver 13 as illustrated in FIG. 4. There is a current cell (channel and time slot or slots) $C_{PG}$ 42 associated with the PG mode, and the user-interface unit identifies $C_{PG}$ to the viewer by blinking the program title in that cell.

A system for positioning the spreadsheet is disclosed in U.S. Pat. No. 5,353,121 issued to Young, Roop and Faber on Oct. 4, 1994. When the viewer selects the PG mode, the spreadsheet reappears as it was just before the viewer had selected TV mode previously. Thereafter, the viewer may move $C_{PG}$ to a cell at earlier or later time slots by pressing left and right-arrow keys 355 and 356, respectively, on the remote control. The user may also move $C_{PG}$ to lower or higher-numbered channels by pressing the up and down-arrow keys 353 and 354, respectively, of the remote control. When $C_{PG}$ reaches a boundary of the displayed portion of the program spreadsheet, one more step in the same direction as the previous one moves the displayed portion of the program spreadsheet by one channel or one time slot such that $C_{PG}$ remains at the boundary.

While the electronic program guide is in PG mode, the viewer can move $C_{PG}$ to any cell and press a select key 357 on the remote control. At that point, the program title in the selected cell will be both underlined and blinking. When the viewer moves $C_{PG}$ again, a previously selected cell such as cell 43 will be underlined only. More than one cell can be selected. However, selecting a second cell that overlaps a previously selected first cell deselects the first cell in the overlapping time slot or slots. The program title in a cell that has been partially unselected in this manner will be underlined only in the remaining selected time slot or slots. A cell that has been selected or partially selected can be toggled back to the unselected state by moving $C_{PG}$ to that cell again and pressing the select key.

After selecting or partially selecting one or more cells in PG mode, the viewer can toggle the electronic program guide back to TV mode by pressing the PG/TV key 351. The data processor 34 will carry out the viewer's selections by sending the channel number of selected or partially selected cells to the tuner 31 as the selected time slots become current. If the current time slot is unselected, the electronic program guide will return to the channel that was last shown in TV mode. It should be noted that the left and right-arrow keys 355 and 356 and the select key 357 have no defined operation in TV mode, so the data processor should do nothing on such inputs.

Computer-literate users may prefer an interactive electronic program-guide system that allows a viewer to choose programs from a spreadsheet. However, it still requires viewers to base their decisions on program titles that they read off the television screen. The program titles also unavoidably become somewhat cryptic when they are shortened to fit into a the cells of a spreadsheet. Because of these drawbacks, a viewer with an interactive electronic program-guide system may still choose to surf up and down the channel lineup in TV mode. Therefore, it is the object of the present invention to provide a more intuitive electronic program-guide system that allows a viewer of a program in a particular category to "sideways surf" to the next channel carrying another program in the same category.

SUMMARY OF THE INVENTION

The electronic program-guide (EPG) system of the current invention comprises a method which allows a viewer of a television program in a category (such as movies, sports, specials, etc.) appearing on a channel of a television-distribution network to select a second channel carrying another program in the same category. Illustratively, the inventive EPG system can be loaded into a user-interface unit of the prior-art electronic program-guide system, and all defined operations in the program guide (PG) and television (TV) modes will continue to work. However, previously undefined inputs at the remote control are made meaningful in the inventive EPG system. The program guide in the inventive EPG system includes a category for each program, and the new functionality relates to choosing programs based on their categories.

In a preferred embodiment, the left and right-arrow keys, and the select key of the remote control are defined in the inventive EPG system in its TV mode. In a first embodiment, a viewer can surf to the next higher or lower-numbered channel carrying another program in the same category as the program he or she is currently watching by pushing the right or left-arrow key, respectively. If the viewer presses the select key in the TV mode, the EPG system will change to the next category in which a program is currently showing. If more than one channel is carrying such a program, the lowest-numbered channel showing a program in the next category will be selected.

In TV mode, the inventive EPG system indicates the availability of other channels carrying programs in the same category as the program in the channel just selected. Illustratively, a right arrow is shown when such channels exist at higher numbers and a left arrow is shown when they exist at lower channel numbers. This indication is illustratively given at the top of the screen in what is called a "channel hat or other icon." The channel hat is displayed for a few seconds only and illustratively also contains the channel number, title, and category of the program in the channel just selected.

The new functionality relates to the categorization of programs described in "Program Guide for Digital Television, ATSC Standard," which is Document A/55 dated Jan. 3, 1996 of the Advanced Television Systems Committee. The contents of this document are incorporated herein by reference. This standard describes a format for transmitting a master program guide of data about current and future programs in a digital-television system. The standard provides an 8-bit index to a classification of programs. Not all of the 256 combinations have been assigned. The standard classifies the categories that it does assign into 6 types: Movies, Sports, Specials, Series, News, and Shopping. Illustratively, the inventive EPG system expands this short list to 13 categories: Movies (all), Sports (all), Specials (all), Series (Children, Comedy, Drama, other), News (Business, Current, General Interest, Sports, Weather), and Shopping.

DETAILED DESCRIPTION OF THE INVENTION

Figure 5:
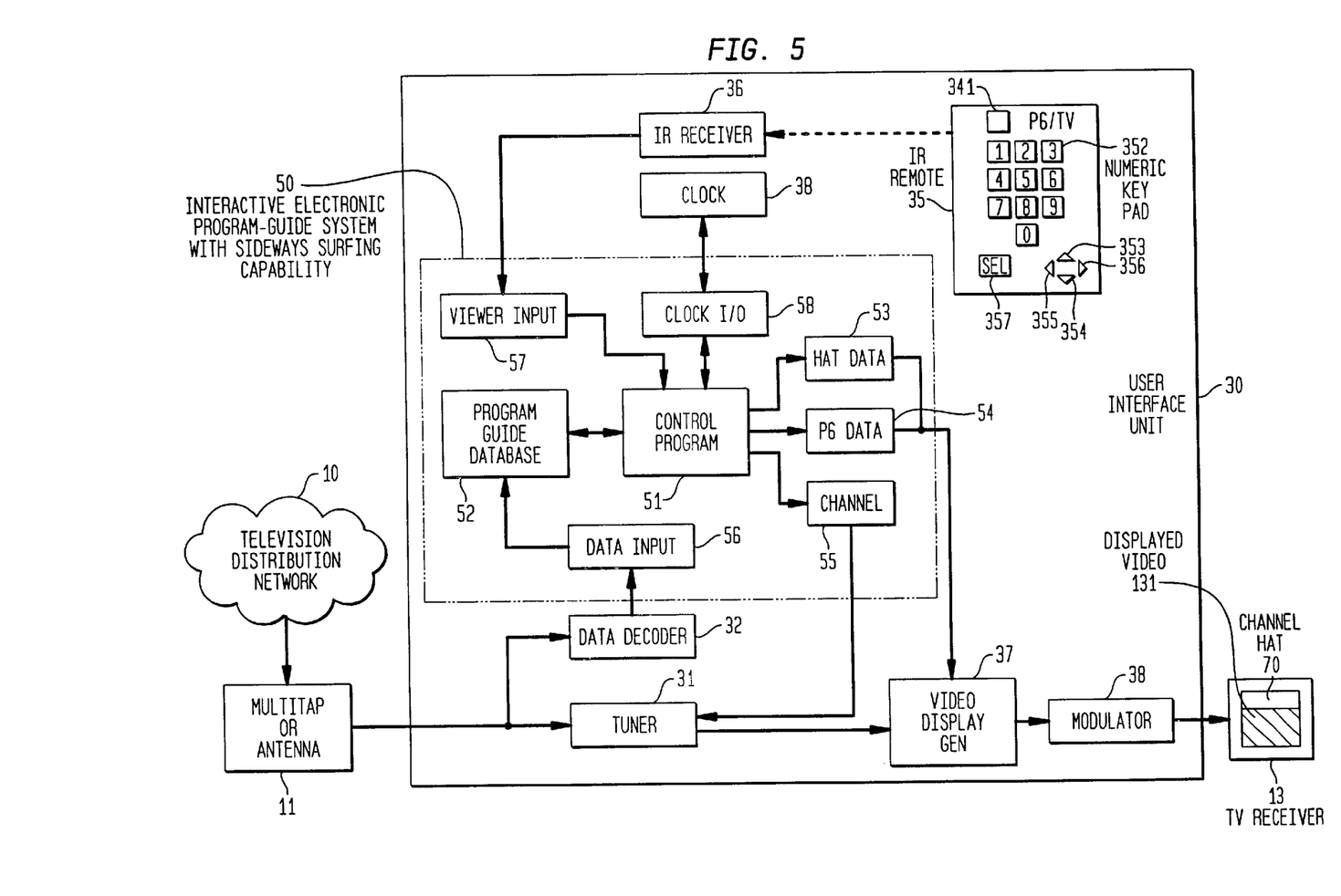
FIG. 5 schematically illustrates an interactive electronic program-guide (EPG) system with sideways-surfing capability in data and software.

FIG. 5 schematically illustrates an interactive electronic program-guide (EPG) system 50 in accordance with an illustrative embodiment of the invention. The EPG system 50 comprises a control program 51, a program-guide database 52, a hat-data module 53, a program-guide data module 54, a channel register 55, a data-input module 56, a viewer-input module 57, and a clock I/O module 58. The EPG system preferably resides on a user-interface unit 30 that accepts data and television programs on channels from a television-distribution network 10. The user-interface unit also accepts commands that a viewer inputs at a remote-control device 35. The EPG system interprets the command and data inputs and directs the user-interface unit to send video modulated on a fixed channel to a television receiver 13. The video comprises a television program or program-guide information or program-guide information superimposed over part of a television program.

The EPG system 50 has a program-guide (PG) mode and a television (TV) mode, and the viewer can toggle the EPG system back and forth between these modes by pressing a PG/TV key 351 at a remote-control device 35. In PG mode, the control program 51 formats program-guide information as a spreadsheet and passes the data to the program-guide data module 54, which causes the video-display generator 37 to output a video signal that causes the spreadsheet to be graphically displayed on the television receiver 13. The spreadsheet shows current and future program titles in cells, with rows labeled by channel numbers and columns labeled by time slots. The control program allows the viewer to navigate over the spreadsheet using arrow keys 353–356. The viewer can also select a program or cancel a previous selection of a program in a cell of the spreadsheet by pressing a select key 357, which is also located on the remote-control device.

Figure 6A:
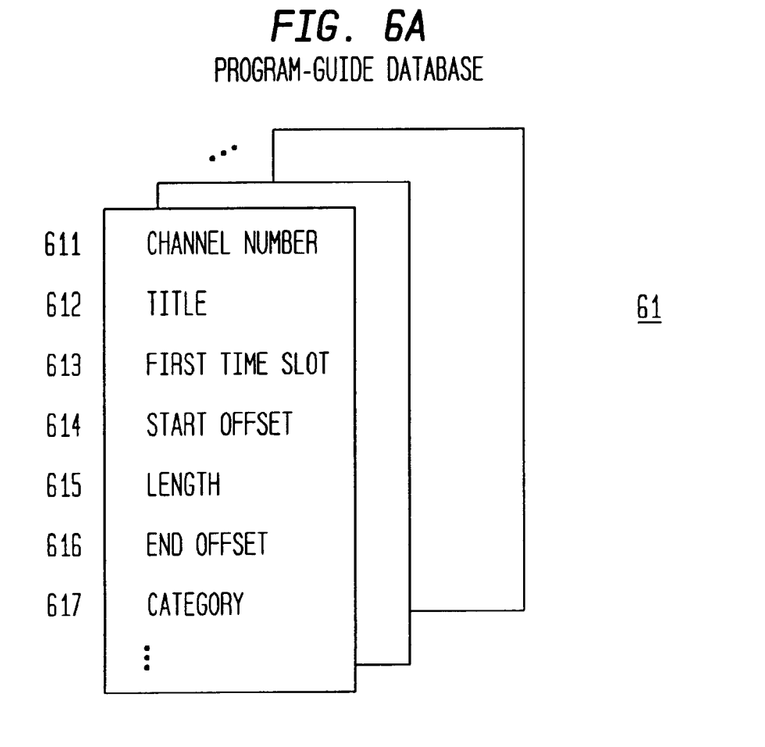
FIG. 6A illustrates a program-guide database.

The program-guide database contains a record for each program, and each record has information for its program in fields as illustrated in FIG. 6A. The channel-number field 611 contains the number of the channel on which the program is scheduled to appear. There is also at least a title field 612, a first time slot field 613, a start offset in minutes 614, a length in 30-minute time slots 615, an end offset in minutes 616, and a category field 617. The start offset is the delay from the start of the first time slot to the start of the program. The end offset is the delay from the end of the last time slot until the end of the program. The EPG system does not assume that programs are assigned to a fixed list of categories or even to a fixed list of channels. The contents of a preferred embodiment of the program-guide database are entirely determined by a master program guide that is received from the television-distribution network at a data decoder 32. However, an illustrative list of categories is Movies (all), Sports (all), Specials (all), Series (Children, Comedy, Drama, other), News (Business, Current, General Interest, Sports, Weather) and Shopping. A data-input module 56 uses channel, title, time-slot and category information in the master program guide to fill in records in the program-guide data base and discards other information.

Figure 6B:
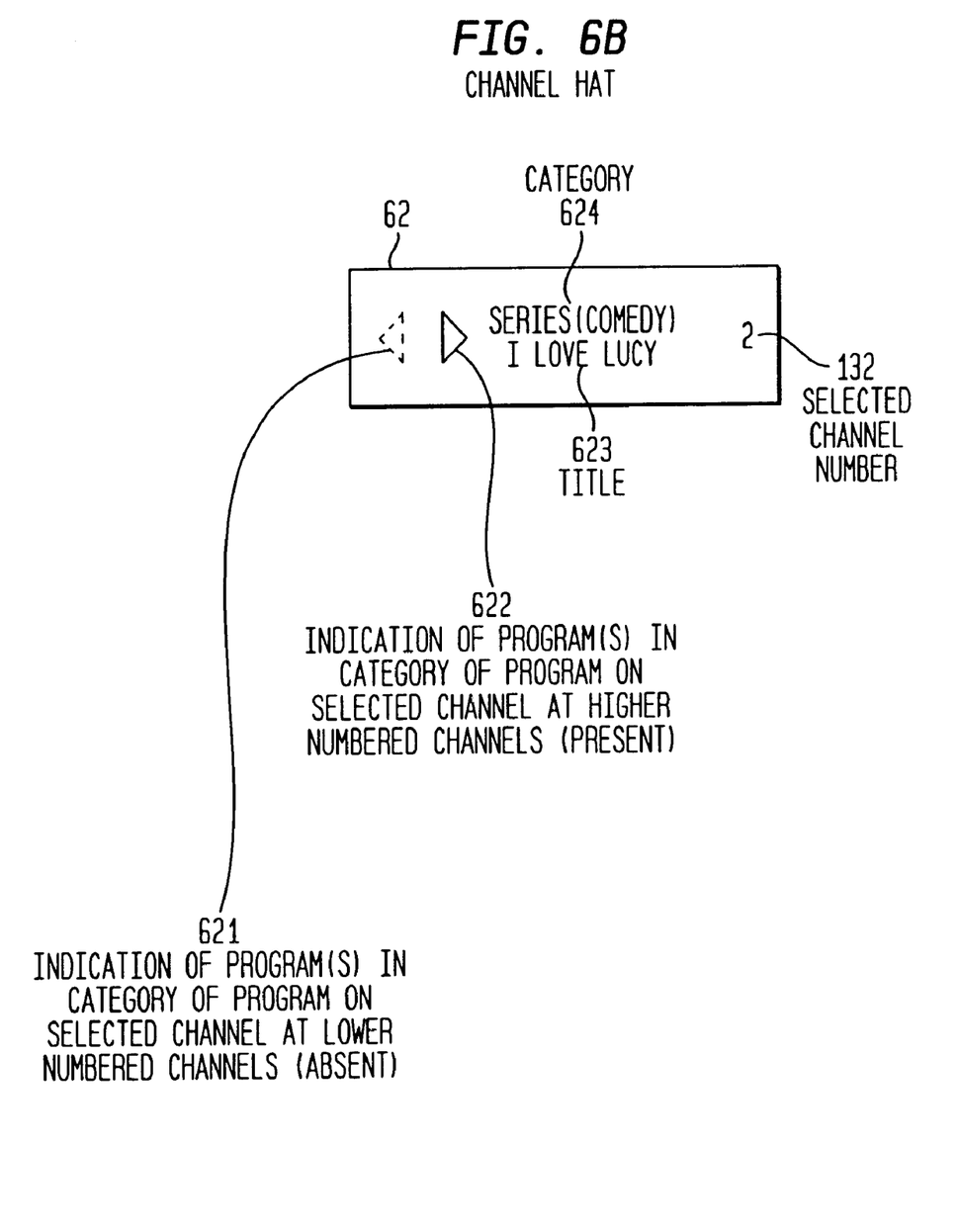
FIG. 6B illustrates graphical information that overlays the video of a program just selected.

In TV mode, the EPG system responds to up and down-arrow keys 353 and 354 by incrementing the channel from which the user-interface unit 30 takes the television program that it sends to the television receiver. The new channel will be the next higher or lower channel on which the television-distribution network 10 carries scheduled programs. The viewer can also select a channel by number by pressing keys on the numeric-key pad 352 of the remote-control device 35. When the channel is changed, a channel hat 62 (or other icon) is superimposed for a few seconds at the top of the displayed video in TV mode.

As shown in FIG. 6B, the channel hat 62 (or other icon) comprises at least an indication of the channel number 132 just selected and of the existence of other channels carrying programs in the same category as the program on the selected channel. The presence of an arrow 621 pointing to the left indicates the existence of such programs at lower-numbered channels. The viewer can find a program that may be of interest by surfing sideways to the left, which the viewer accomplishes by pressing the left-arrow key 355. An arrow 622 pointing to the right indicates that the viewer can surf to such a program at a higher-numbered channel by pressing the right-arrow key 356. If the viewer has reached the highest channel in that category, pressing the right-arrow key 356 preferably brings the user to the lowest channel currently running a program in the desired category. Similarly, if the viewer has reached the lowest channel in the category, pressing the left-arrow key 621 preferably brings the user to the highest channel currently running a program in the desired category.

FIG. 6B also shows the title 623 and category 624 of the program on the newly selected channel displayed in the hat. The video-display generator 37 receives data that allows it to display the channel hat 62 from the hat-data module 53. The hat-data module retrieves the channel number 132, title 623, and category 624 of the program on the newly selected channel from the control program 51. The control program finds the channel number 132, title 623 and category 624 of the newly selected channel in the channel number field 611, title field 612, and category field 717, respectively of a record in the program-guide database 52. The control program also reads the current time with the help of a clock I/O module 58 and determines whether any other program is current by calculating a starting time and an ending time from the information in the timing fields 613–616 on the record for that program in the program-guide database.

Figure 6C:
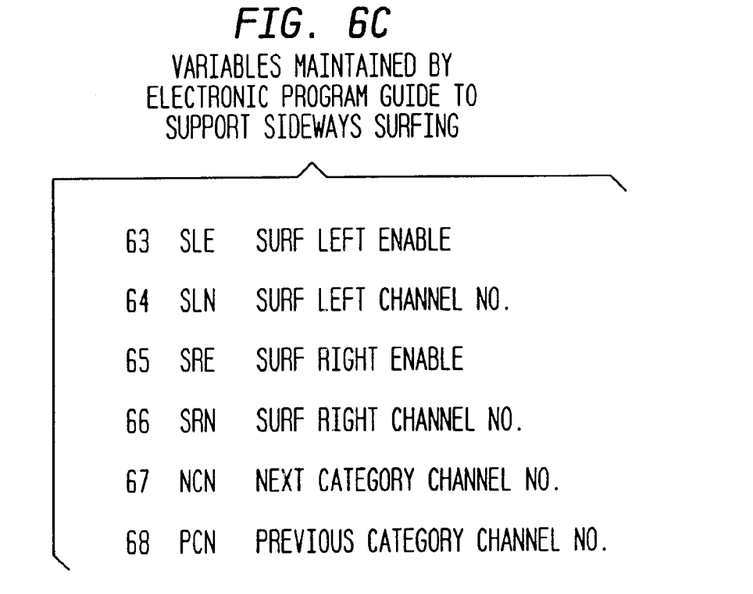
FIG. 6C lists variables that allow programs to be selected by their categories in the EPG system of FIG. 5.

FIG. 6C lists other variables that the control program 51 maintains to support sideways surfing in TV mode. In particular, binary variables SLE 63 and SRE 65 are set when surfing to the left and right are enabled, respectively. The control program passes these variables to the hat-data module, which shows the left arrow 621 if SLE is set and the right arrow 622 if SRE is set. The control program also maintains channel number SLN 64, which will be selected if the viewer presses the left-arrow key, and channel number SRN, which will be selected if the viewer presses the right-arrow key. Finally, the control program in the first embodiment maintains a channel number NCN 67, which is the number of the first channel carrying a program in the next category after the category 624 of the program on the newly selected channel. Channel NCN will be selected if the viewer presses the select key 357. A second embodiment of the invention makes use of a previous category channel number PCN 68. The control program finds PCN by stepping backwards through the list of categories until a category is found in which a program is available.

Figure 7:
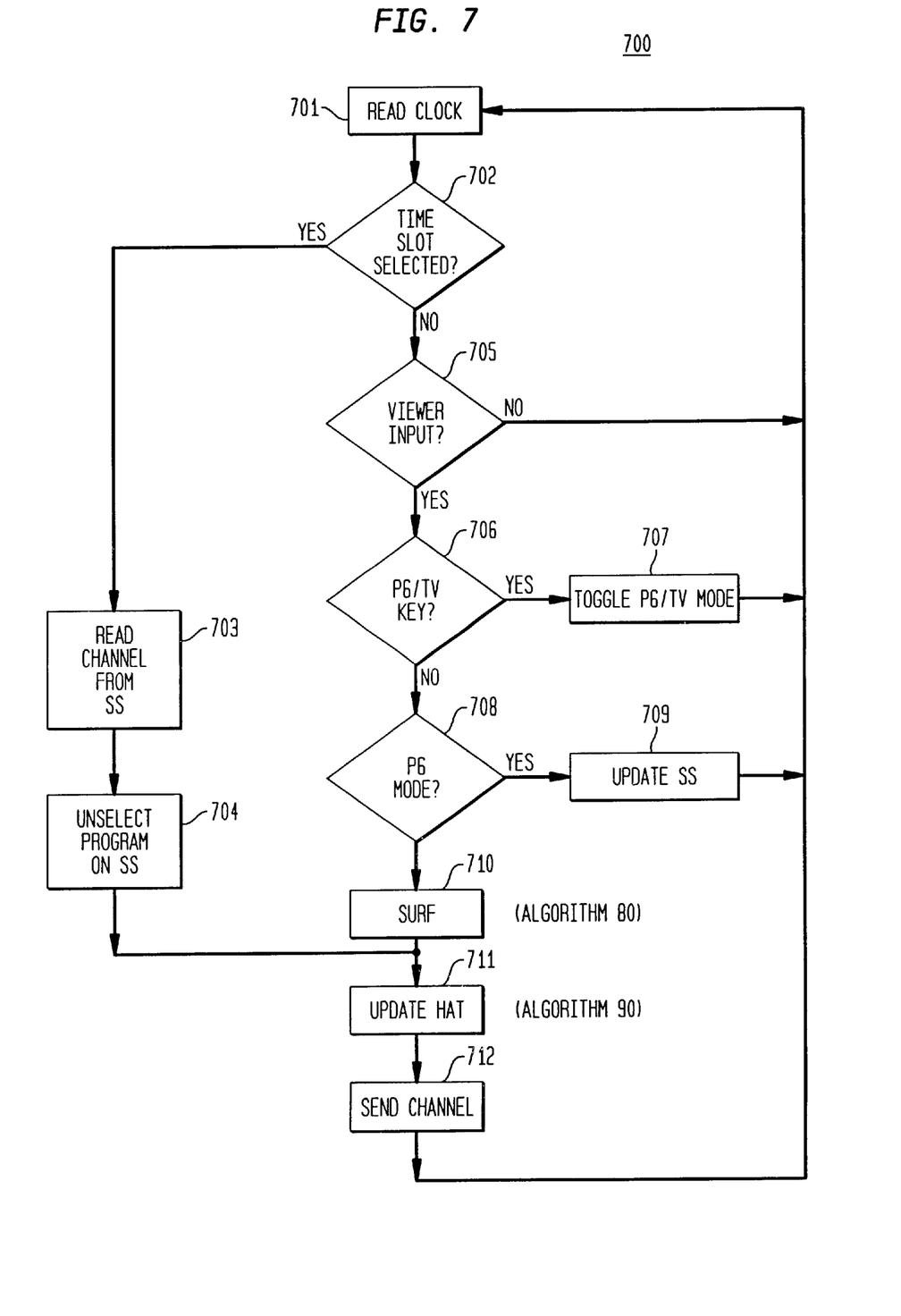
FIG. 7 is a flow chart of the control program used in the EPG system of FIG. 5.

FIG. 7 is a flow chart of a preferred method 700 performed by the control program 51. The first step 701 is to read the clock and determine, at step 702, if a current program was selected on the spreadsheet in advance. If a program was selected in advance, method 700 branches to step 703, where the channel number of the preselected program is read from the spreadsheet. Method 700 cancels the selection on the spreadsheet at step 704 to allow the viewer to make other selections in TV mode if he or she wishes. Method 700 then proceeds to update the channel hat and other information used in sideways surfing at step 711. Method 700 sends the newly selected channel to the channel register 55 at step 712. The channel register then causes the tuner 31 to pass the video of the program on the newly selected channel to the video-display generator 37.

If the current time slot was not selected, method 700 branches to step 705 and uses the viewer-input module 57 to test for viewer input. If there is no input, method 700 branches to 701. Thus method 700 loops through steps 701,702, and 705 until the viewer inputs a command at the remote control 35. Method 700 branches to step 706 when the viewer does input a command and tests to see whether the viewer pressed the PG/TV key 351. If the viewer did press key 351, method 700 toggles from TV mode to PG mode, or vice versa and starts over at step 701. If the viewer did not press the PG/TV key, method 700 branches to step 708, where the current mode of the EPG system is checked. If the EPG system is in PG mode, method 700 branches to step 709, where the command is accepted as a navigation from or selection of a cell on the spreadsheet. If the EPG system was not in PG mode, method 700 proceeds to step 710, where the viewer's command is interpreted in TV mode by a method 800 shown in FIG. 8. At step 711, a channel has been newly selected, and it is necessary to update the channel hat and prepare for sideways surfing from the newly selected channel. This is done by a method 900 shown in FIG. 9A. At step 712, method 700 sends the newly selected channel to the channel register 55, which in turn causes the tuner 31 to pass the video of the program on the newly selected channel to the video-display generator 37. Method 700 then starts over again at step 701.

Figure 8:
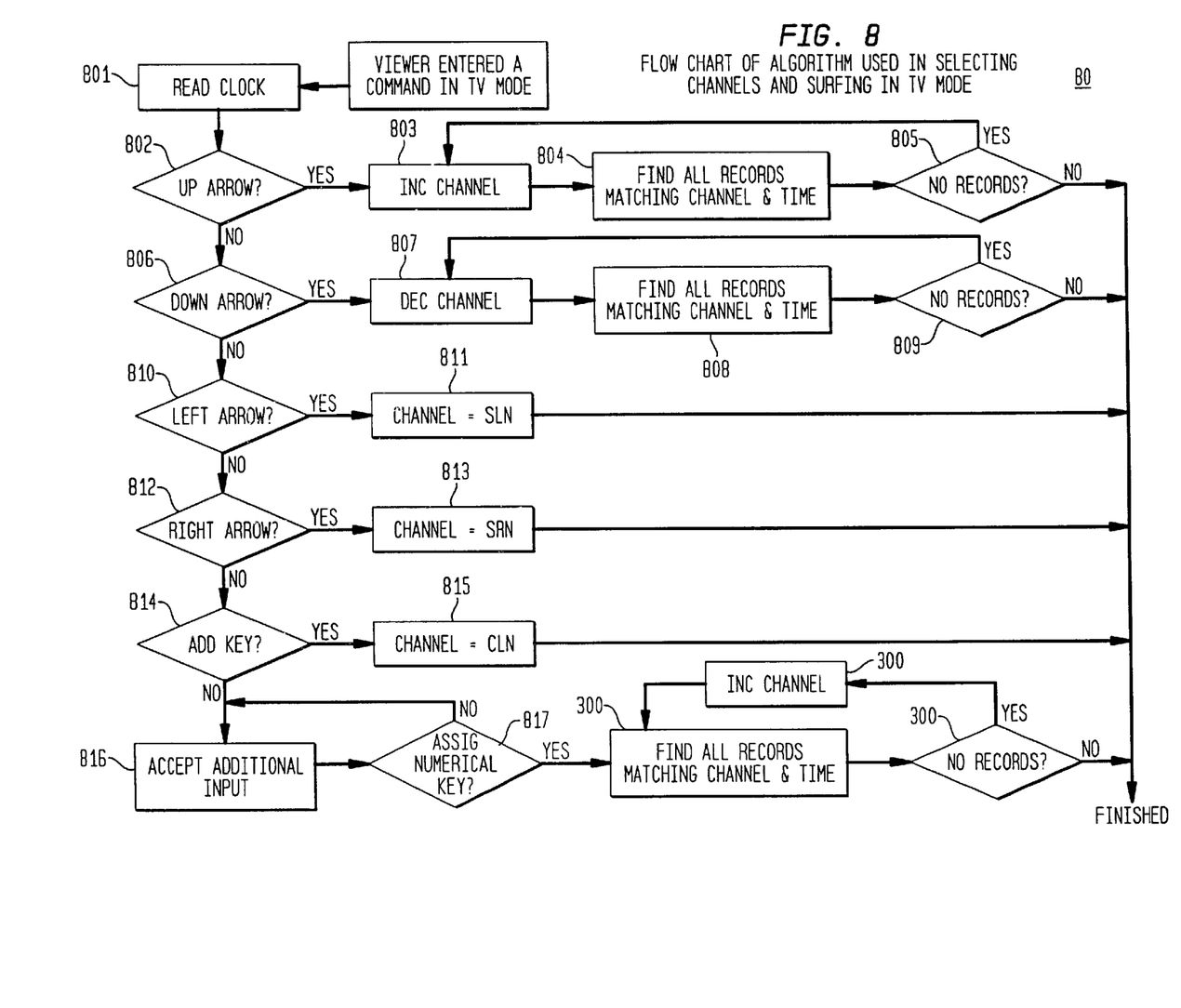
FIG. 8 is a flow chart of the method that the EPG system of FIG. 5 performs in TV mode to support the selection of channels.

When the EPG system 50 is in TV mode and the viewer presses keys on the remote-control device 35, the control program 51 performs method 800 shown in FIG. 8. Method 800 compares the input with the allowed inputs and determines the newly selected channel number accordingly. At step 801, method 800 uses the clock I/O module 58 to determine the current time. At step 802, method 800 tests whether the viewer pressed the up-arrow key 353. If the result is positive, method 800 branches to step 803, where the channel number is incremented. At step 804 the set of all records that match the incremented channel at the current time are accessed in the program-guide database 52. At step 805 the set is tested, and if the set is empty, method 800 branches back to step 803. Thus steps 803, 804 and 805 form a loop that is repeated until a channel is found that is carrying a program at the current time, and then method 800 is completed.

If the up-arrow key was not pressed, method 800 next tests the input again at step 806. If the down-arrow key 354 was pressed, method 800 decrements the channel number at steps 807, 808 and 809 until a channel is found that is carrying a scheduled program. The channel number being determined, method 800 is completed. If the down-arrow key was not pressed, method 800 proceeds to step 810. At step 810, the input is tested again, and if the left-arrow key 355 was pressed, method 800 branches to step 811, where the channel number is set to SLN 64, and method 800 is completed. SLN is the channel number that the hat-update method 900 determined to be available for sideways surfing to the left after the previous channel selection was made.

If the left arrow was not pressed, method 800 proceeds to step 812, where the input is tested again, and if the right-arrow key 356 was pressed, method 80 proceeds to step 813. At step 813, the channel number is set to SRN 65, which is the channel number that the hat-update method 900 last determined to be available for sideways surfing to the right. After performing step 813, method 800 is completed.

If the right-arrow key was not pressed, method 800 branches to step 814, where the input is tested again. If the select key 357 was pressed, method 800 branches to step 815. At step 815 the channel number is set to NCN 67, which is the first channel number in the next category at which a program is scheduled for the current time. After step 815 is performed, method 800 is completed. If the select key was not pressed, it means that a key on the numeric-key pad 352 was pressed, and method 800 proceeds to step 816. Method 800 then accepts zero or more additional digits specifying a channel number by testing the input at step 817 and repeating step 816 until a non-numeric key is pressed. When the viewer has indicated that the channel number is complete by pressing one of the arrow keys or the select key, method 800 tests the channel at steps 818 and 819 to see if it is scheduled to carry a program at the current time. Otherwise the channel number is incremented at step 820, and steps 818, 819 and 820 are repeated until a channel is found that is not empty. When the channel number has been finally determined, method 800 is completed.

Figure 9A:
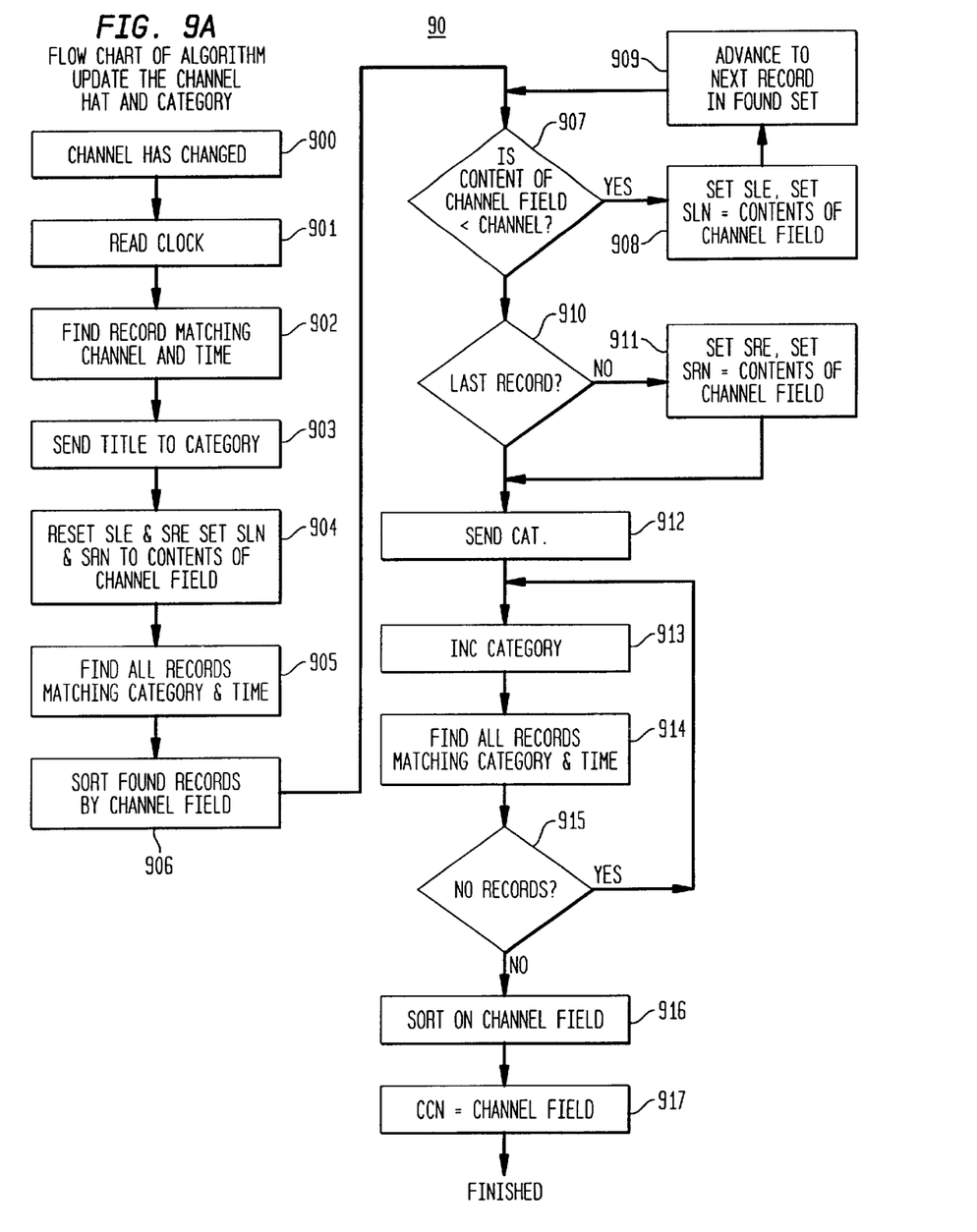
FIG. 9A is a flow chart of the method that the EPG system of FIG. 5 performs to determine information displayed in FIG. 6B and listed in FIG. 6C.

When the control program 51 changes the channel, it determines the information needed by the hat-data module 53 and other information needed to support sideways surfing using method 900 illustrated in FIG. 9A. Method 900 reads the clock at 901 using the clock I/O module 58 and then consults the program-guide database 52 at step 902. At step 903, the title 623 and category 624 that will be shown in the channel hat are read from the record for the program scheduled on the newly selected channel 132 at the current time. At step 904, the binary variables SLE 63 and SRE 65 that enable the display of the left and right arrows 621 and 622 in the channel hat 62 are reset. Also SLN 64 and SRN 66 are set equal to the contents of the channel field. Method 900 subsequently sets one or both of these variables causing the corresponding arrows to be displayed in the channel hat if sideways surfing is available.

Predefining them prevents the system from changing the channel if the viewer tries to surf sideways to a non-existent program. At step 905, method 900 finds the set of records for programs showing at the current time that fall in the same category 624 as the program showing on the newly selected channel. If this set contains more than one record, sideways surfing will be enabled in at least one of the two directions. At step 906, method 900 sorts the found set of records in order of increasing contents in the channel-number field 611. When such a sort is performed, the current record presented by the program-guide database becomes the first member of the ordered set. At step 907, the channel number of the current record is compared with the newly selected channel number 132. If the channel number on the current record is less, it means that surfing to the left should be enabled and method 900 branches to step 908. At step 908 SLE is set to enable the left arrow in the channel hat, and SLN is set equal to the contents of the channel field on the current record. At step 909, the database is caused to present the next record of the found set after which step 907 is performed again. Thus steps 907, 908 and 909 form a loop. Eventually, if not the first time around the loop, the contents of the channel-number field will equal the newly selected channel number, and method 900 will branch to step 910. This leaves SLN set to the highest channel number in the set that is less than the newly selected channel number. If the current record presented by the database at step 910 is not the last record in the set, it means that surfing to the right should be enabled, and method 900 branches to step 911. Otherwise, method 900 branches directly to step 912.

At step 911, SRE is set to enable the right arrow in the channel hat, and SRN is set equal to the contents of the channel field on the current record. At step 912, method 900 passes the information needed to display the channel hat to the hat-data module 53, which causes the channel hat to be displayed for a few seconds. The final task that method 900 does is to determine a next channel in a next category by incrementing the category at step 913. At step 914, method 900 finds the set of records for programs showing at the current time that fall in this new category. The set is tested at step 915. If it is empty, method 900 branches to step 913. Thus method 900 increments the category by repeating steps 913, 914 and 915 until it finds a category in which at least one channel is carrying a program at the current time. At step 916, this set is sorted on the contents of the channel-number field and NCN 67 is set equal to the contents of the channel-number field of the first record at step 917. Method 900 is then completed.

In a second embodiment, there is also a PG mode and a TV mode, and the viewer can cause the EPG system 50 to toggle back and forth between these modes by pressing the TV/PG key 351. The PG mode of the second embodiment is also unchanged from the prior-art system. Furthermore, the viewer can select channels in a normal TV mode using the numeric-key pad 352 and up and down-arrow keys 353 and 354 as in prior-art systems. However, by pressing the select key 357, the viewer can cause the EPG system 50 to toggle back and forth between normal TV mode and a category-surfing TV mode. In category-surfing TV mode, the EPG system responds to the left and right-arrow keys as described in the first embodiment. However, by pressing the up-arrow key, the viewer can select the first available channel NCN 67 of the next category in which a program is showing. This function was assigned to the select key in the first embodiment. In the second embodiment, a previous category channel number PCN 68 would be selected by the down-arrow key.

Figure 9B:
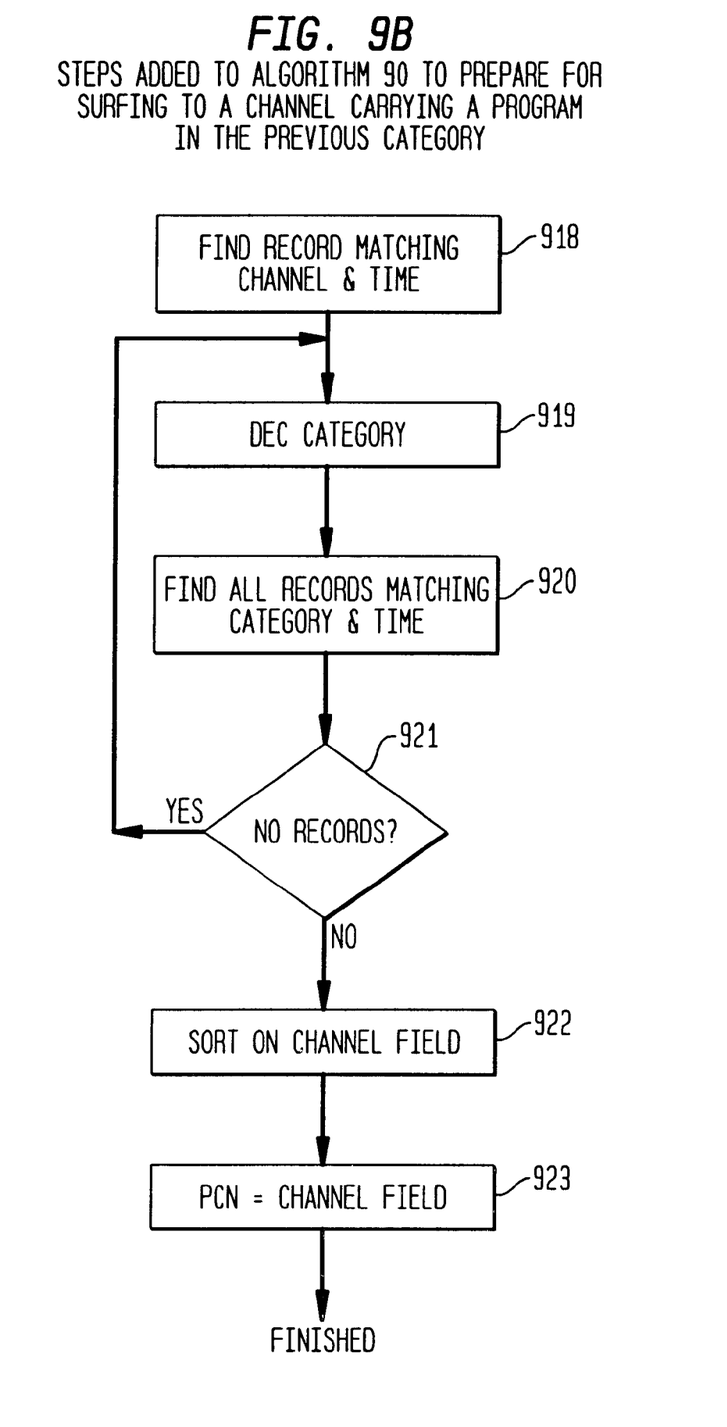
FIG. 9B is a flow chart of an alternative to the method of FIG. 9A.

FIG. 9B shows steps 918–923 that are added to method 900 to prepare for surfing to a channel carrying a program in the previous category. At step 918, the method accesses the record for the program on the current channel 32 in the database 52. The category is decremented at step 919. At step 920, the method finds the set of records for programs showing at the current time which fall in this new category. The set is tested at step 921. If it is empty, the method branches to step 919. Thus, the method decrements the category by repeating steps 919, 920 and 921 until it finds a category in which at least one channel is carrying a program at the current time. At step 922, this set is sorted on the contents of the channel-number field and PCN 68 is set equal to the contents of the channel-number field of the first record at step 923. The expanded method used in the second method is then completed.

Finally, the above described embodiments of the invention are intended to be illustrative only. Numerous alternative embodiments may be devised by those skilled in the art without departing from the scope of the following claims.

What is claimed is:

1. A method of providing channel selection in a receiver, the receiver configured to receive a plurality of channels, the method comprising the steps of:
   (a) displaying a first channel of a sequence of the plurality of channels in response to a first control signal;
   (b) indicating if there is at least one content-related channel having a content in a same category of the first channel;
   (c) displaying the at least one content-related channel in response to a second control signal, wherein the second control signal is different from the first control signal; and
   (d) displaying a next sequential channel, wherein the next sequential channel comes after a displayed channel in response to a repetition of the first control signal.

2. The method of claim 1 wherein the step of indicating further comprises the step of displaying a graphical overlay over said first channel.

3. The method of claim 2 wherein the step of displaying a graphical overlay further comprises the step of:
   displaying a first signal indicating an existence of a higher number channel; and
   displaying a second signal indicating an existence of a lower numbered channel.

4. The method of claim 1 wherein the step of displaying the at least one content-related channel in response to a second control signal occurs without an intervening command.

5. The method of claim 1 wherein the step of displaying a next sequential channel in response to a repetition of the first control signal occurs without an intervening command.

6. The method of claim 1 further comprising the step of:
   (e) navigating from a first content-related channel of said at least one channel to a second content-related channel of said at least one channel in response to said second control signal.

7. An apparatus for providing channel selection, the apparatus comprising:
   a receiver operative to receive a plurality of channels, to display a first channel, and indicate if there is one or more content-related channels having content in a same category as a content of the first channel;
   a first channel control switch configured to provide numerically sequential navigation of said plurality of channels; and
   a second channel control switch, different from said first channel control switch configured to provide a navigation of the one or more content-related channels.

8. The apparatus of claim 7 wherein a graphical overlay is displayed over said first channel to indicate if there is at least one content-related channel.

9. The apparatus of claim 7 wherein a transition from the numerically sequential navigation to the content-based navigation occurs without an intervening command.

10. The apparatus of claim 7 wherein a second control-related channel of said at least one content-related channel is displayed after a first content-related channel of said at least one content-related channel in response to said second channel control switch.

11. A channel selection device for use in a video receiver, comprising:

a first channel control switch configured to provide numerically sequential navigation of a plurality of channels supplied to the video receiver; and a second channel control switch, different from the first channel control switch, configured to provide a content-based navigation of at least a first channel and at least one content-related channel having the same content as a content of the first channel.

12. The channel selection device of claim 11 where a transition from the numerically sequential navigation to the content-based navigation occurs without an intervening command.

13. The channel selection device of claim 11 wherein a second repetition of said second channel control switch displays a second content-related channel of said at least one content-related channel.

14. An apparatus for providing channel selection, the apparatus comprising:

a receiver operative to receive a plurality of channels, wherein the receiver is further operative to indicate if there are at least two channels having a content in the same category;

an apparatus configured to receive a first channel control switch for providing a numerically sequential navigation of said plurality of channels; and an apparatus configured to receive a second channel control switch, different from the first channel control switch, for providing a content based navigation of the at least two channels having the same content.

15. The apparatus of claim 14 wherein a transition from the numerically sequential navigation to the content-based navigation occurs without an intervening command.

16. The apparatus of claim 14 wherein a transition from the content-based navigation to the numerically sequential navigation occurs without an intervening command.

17. The apparatus of claim 14 wherein said apparatus displays said availability of said at least one second channel is a graphical overlay on said first selected program.

18. The apparatus of claim 14 wherein said apparatus is configured to display a same-content channel after a repetition of said second control switch.

* * * * *

(12) EX PARTE REEXAMINATION CERTIFICATE (9488th)

United States Patent
Lasky (10) Number: US 6,367,078 C1
(45) Certificate Issued: Jan. 24, 2013

(54) ELECTRONIC PROGRAM-GUIDE SYSTEM WITH SIDEWAYS-SURFING CAPABILITY

(75) Inventor: Michael Lasky, Arlington, VA (US)

(73) Assignee: Verizon Communications Inc., New York, NY (US)

Reexamination Request:
No. 90/011,726, Jun. 2, 2011

Reexamination Certificate for:
Patent No.: 6,367,078
Issued: Apr. 2, 2002
Appl. No.: 08/990,210
Filed: Dec. 12, 1997

(51) Int. Cl.
*H04N 5/445* (2006.01)
(52) U.S. Cl. ............... 725/52; 348/734; 725/38; 725/45
(58) Field of Classification Search .................. None
See application file for complete search history.

(56) References Cited

To view the complete listing of prior art documents cited during the proceeding for Reexamination Control Number 90/011,726, please refer to the USPTO's public Patent Application Information Retrieval (PAIR) system under the Display References tab.

*Primary Examiner* — Joseph R. Pokrzywa (57) ABSTRACT

An electronic program-guide (EPG) system enables a viewer of a television program in a particular category to surf sideways to another program in the same category. The EPG system indicates the availability of such other channels carrying programs in the same category in a channel hat superimposed on the video at the top of the picture. The channel hat may also contain the channel number, title and category of the program in the channel just selected, and it is displayed for a few seconds. Normal surfing up and down to higher or lower-numbered channels is also supported in the usual way in response to the up and down arrow-keys on a remote control device. When the viewer presses the right or left-arrow key, the EPG system surfs sideways to the next higher or lower channel carrying a program in the same category as the current program. Right and left-arrow keys exist on the remote controls of some prior-art electronic program guides without having any function assigned when television programs when the viewer is surfing.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 12 is cancelled.

Claims 1, 7, 11, 14 and 18 are determined to be patentable as amended.

Claims 5, 6 and 13, dependent on an amended claim, are determined to be patentable.

Claims 2-4, 8-10 and 15-17 were not reexamined.

1. A method of providing channel selection in a receiver, the receiver configured to receive a plurality of channels, the method comprising the steps of:
   (a) displaying a first channel of a sequence of the plurality of channels in response to a first control signal;
   (b) indicating if there is at least one content-related channel having a content in a same category of the first channel;
   (c) displaying the at least one content-related channel in response to a second control signal, wherein the second control signal is different from the first control signal; and
   (d) displaying a next sequential channel, wherein the next sequential channel comes after a displayed channel in response to a repetition of the first control signal;
   *wherein step (b) is carried out after step (a) without an intervening viewer command.*

7. An apparatus for providing channel selection, the apparatus comprising:
   a receiver operative to receive a plurality of channels, to display a first channel *in a first mode*, and *while continuing to display the first channel in the first mode,* to indicate if there is one or more content-related channels having content in a same category as a content of the first channel;
   a first channel control switch configured to provide numerically sequential navigation of said plurality of channels *in the first mode*; and
   a second channel control switch, different from said first channel control switch configured to provide a navigation of the one or more content-related channels *in the first mode*.

11. A channel selection device for use in a video receiver, comprising:
    a first channel control switch configured to provide numerically sequential navigation of a plurality of channels supplied to the video receiver; and
    a second channel control switch, different from the first channel control switch, configured to provide a content-based navigation of at least a first channel and at least one content-related channel having [the same] content *in a same category* as a content of the first channel;
    *wherein one of the plurality of channels is displayed in response to the first channel control switch and content-based navigation in response to the second channel control switch occurs without an intervening viewer command.*

14. An apparatus for providing channel selection, the apparatus comprising:
    a receiver operative to receive a plurality of channels, wherein the receiver is further operative to indicate if there are at least two channels having a content in the same category;
    an apparatus configured to receive a first channel control switch for providing a numerically sequential navigation of said plurality of channels; and
    an apparatus configured to receive a second channel control switch, different from the first channel control switch, for providing a content-based navigation of the at least two channels having [the same] content *in the same category;*
    *wherein one of the plurality of channels is displayed in response to the first channel control switch and content-based navigation in response to the second channel control switch occurs without an intervening viewer command.*

18. The apparatus of claim 14 wherein said apparatus is configured to display a same-[content] *category* channel after a repetition of said second *channel* control switch.

\* \* \* \* \*